(12) United States Patent
Andrew et al.

(10) Patent No.: US 11,127,065 B2
(45) Date of Patent: Sep. 21, 2021

(54) SYSTEM AND METHOD FOR RECOMMENDING ENTITIES BASED ON INTEREST INDICATORS

(71) Applicant: Microsoft Technology Licensing, LLC, Redmond, WA (US)

(72) Inventors: Felix G. T. I. Andrew, Seattle, WA (US); Andi F. Rusu, Seattle, WA (US); Eric Youngstrom, Kirkland, WA (US); Scott Andrew Borton, Seattle, WA (US); Anson Ho, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 386 days.

(21) Appl. No.: 15/827,835

(22) Filed: Nov. 30, 2017

(65) Prior Publication Data

US 2019/0164211 A1    May 30, 2019

(51) Int. Cl.
*G06Q 30/06*    (2012.01)
*G06N 20/00*    (2019.01)
*G06F 16/58*    (2019.01)
*G06F 16/532*   (2019.01)
*G06F 16/583*   (2019.01)
*G06F 16/54*    (2019.01)

(52) U.S. Cl.
CPC ....... *G06Q 30/0631* (2013.01); *G06F 16/532* (2019.01); *G06F 16/54* (2019.01); *G06F 16/58* (2019.01); *G06F 16/583* (2019.01); *G06N 20/00* (2019.01)

(58) Field of Classification Search
CPC ................................................. G06Q 30/0631

USPC ....................................................... 705/26.7
See application file for complete search history.

(56) References Cited

U.S. PATENT DOCUMENTS

| 2007/0067279 | A1  |  3/2007 | Bonabeau et al. |
| 2008/0147611 | A1  |  6/2008 | Bennett |
| 2008/0209349 | A1* |  8/2008 | Macadaan ............... G06F 16/54 715/762 |
| 2012/0284145 | A1* | 11/2012 | Kalin ................. G06Q 30/0631 705/26.7 |

(Continued)

OTHER PUBLICATIONS

Hotels.com personalises search service with social network offer, Sep. 1, 20081, Centaur Communications Limited (Year: 2008).*

(Continued)

*Primary Examiner* — Brittney N Miller
(74) *Attorney, Agent, or Firm* — Holzer Patel Drennan

(57) ABSTRACT

Entities such as hotels, restaurants, resorts, houses, vehicles, and other places and things, are associated with images of each entity. The images are tagged using machine learning to identify what aspects of the associated entity are captured by each image. When a user is requested to select an entity from a set of entities, a user preference model is used to determine what tags the user is interested in. The tags are used to select images associated with the entities from the set of entities, and the selected images are displayed to the user. The user can then provide indicators that show which of the displayed images the user likes or dislikes. Based on the indicators, one or more entities from the set of entities is presented to the user. The model may also be updated based on the indicators.

11 Claims, 11 Drawing Sheets

(56) References Cited

U.S. PATENT DOCUMENTS

| | | | |
|---|---|---|---|
| 2012/0295640 A1 | 11/2012 | Mei et al. | |
| 2015/0142711 A1* | 5/2015 | Pinckney | G06Q 30/02 706/12 |
| 2015/0262282 A1* | 9/2015 | Walti | G06Q 30/0631 705/26.7 |
| 2016/0048537 A1* | 2/2016 | Epstein | G06Q 30/0631 705/26.7 |

OTHER PUBLICATIONS

"International Search Report and Written Opinion Issued in PCT Application No. PCT/US2018/060217", dated Jan. 25, 2019, 11 Pages.

"Office Action Issued in European Patent Application No. 18814739.1", dated Feb. 19, 2021, 7 Pages.

* cited by examiner

For your stay in San Diego from August 1-August 5 please select the images that you find the most appealing 330a 330b 330c 330d 330e 330f 330g 330h 330i 330j 330k 330l Submit  340

320

Based on your selections you may
enjoy the following hotels:

410a

Balboa Hotel $$$
333 Main Street
San Diego, Ca 92029

330h

Book    440a

410b

Old Town Hotel $$
440 Maple Street
San Diego, Ca 92029

330g

330k

Book    440b

Pick Again    450

300

Jim - For your dinner with Gina on December 20 at 7pm select the dishes that you find the most appealing:

Submit

Gina - For your dinner with Jim on December 20 at 7pm select the dishes that you find the most appealing:

Submit 640

Jim – Based on your selections and
Gina's selections we recommend:

710

Roberto's $$$
1809 Water Street
San Diego, Ca 92029

550f

550e

Book 740

Pick again 750

700

SYSTEM AND METHOD FOR RECOMMENDING ENTITIES BASED ON INTEREST INDICATORS

BACKGROUND

Currently, when a user browses for entities such as restaurants and hotels, they typically perform a search based on criteria such as availability, location, price, cuisine, etc. The user then drills down on the entities in the set of search results by looking at images or other information about each entity that may help the user make a selection.

For example, for entities such as hotels, a user may start by searching for hotel rooms based on location and desired dates. After receiving a set of matching hotels, the user may begin learning about each matching hotel by looking at pictures of the various features of the hotel such as the pool, the bar, the gym, the room, and the exterior.

In another example, for entities such as restaurants, a user may start by searching for reservations at a particular date and time near a particular location. After receiving a set of restaurants with availability at the specified date and time, the user may begin looking at images of the matching restaurants such as images of dining rooms or bars, or images of particular dishes or menu items that the user is interested in.

As may be appreciated, there are many drawbacks associated with selecting entities as described above. First, after the user receives the set of matching entities, the user is often forced to open or visit multiple webpages to learn about each entity.

For example, for entities such as hotels, a user may be interested in selecting a hotel based on the quality of its gym and bar. However, most hotel reservation applications show a single image, often of the hotel exteriors, in a set of search results. Accordingly, the user must travel to a different webpage, or even a different website, to view the images of gyms and bars that the user is interested in.

Similarly, for restaurant entities, a user may be interested in viewing images of certain dishes, such as vegetarian dishes, for example, that are available at each restaurant returned in a search. However, viewing these images may require several clicks by the user, or may require that the user visit a different website focused on restaurant reviews.

Another drawback is that even if the user is able to locate the images that the user is interested in for each entity, there is no way for the user to easily compare the images across different entities. For example, for hotel entities, the user may have been able to locate an image of each hotel bar that they are considering, but those images may be spread across multiple different webpages, making a direct comparison difficult without resizing or moving multiple browser windows. Comparing images of restaurant dishes across multiple webpages and browser windows may be similarly inconvenient.

SUMMARY

Entities such as hotels, restaurants, resorts, vehicles, and other places and things, are associated with images of each entity. The images are tagged using machine learning to identify what aspects of the associated entity are captured by each image. When a user is requested to select an entity from a set of entities, a user preference model is used to determine what tags the user is interested in. The tags are used to select images associated with the entities from the set of entities, and the selected images are displayed to the user in a single user interface. The user can provide indicators that show which of the displayed images the user likes or dislikes. Based on the indicators, one or more entities from the set of entities is presented to the user. The model may also be updated based on the indicators.

In an implementation, a system for selecting and displaying images for each of a plurality of entities and for recommending an entity of the plurality of entities based on interest indicators is provided. The system includes at least one computing device and an image engine. The image engine receives identifiers of a plurality of entities; receives a plurality of images for each entity of the plurality of entities, wherein each image is associated with a tag; for each entity of the plurality of entities, selects one or more images of the plurality of images associated with the entity based on the tags associated with the images of the plurality of images associated with the entity; for each entity of the plurality of entities, displays the selected one or more images associated with entity; receives interest indicators for the displayed images; and based on the received interest indicators, recommends an entity of the plurality of entities.

In an implementation, a system for selecting and presenting images for each of a plurality of entities and for recommending an entity of the plurality of entities based on interest indicators is provided. The system may include at least one computing device and an image engine. The image engine receives identifiers of a plurality of entities; receives a first preference model associated with a first user and a second preference model associated with a second user; receives a plurality of images for each entity of the plurality of entities, wherein each image is associated with a tag; selects a first set of images from the plurality of images associated with each entity based on the tags associated with the images and the first preference model; provides the first set of images to the first user; selects a second set of images from the plurality of images associated with each entity based on the tags associated with the images and the second preference model; provides the second set of images to the second user; receives first interest indicators from the first user for the first set of images; receives second interest indicators from the second user for the second set of images; and based on the first and second interest indicators, recommends an entity of the plurality of entities to the first user and the second user.

In an implementation, a method for selecting and presenting images for each of a plurality of entities and for recommending an entity of the plurality of entities based on interest indicators is provided. The method includes receiving identifiers of a plurality of entities by a computing device; receiving a plurality of images for each entity of the plurality of entities by the computing device, wherein each image is associated with a tag; for each entity of the plurality of entities, selecting one or more images of the plurality of images associated with the entity based on the tags associated with the images of the plurality of images associated with the entity and a preference model by the computing device; for each entity of the plurality of entities, providing the selected one more images associated with entity by the computing device; receiving interest indicators in the provided images by the computing device; and based on the received interest indicators, recommending an entity of the plurality of entities by the computing device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
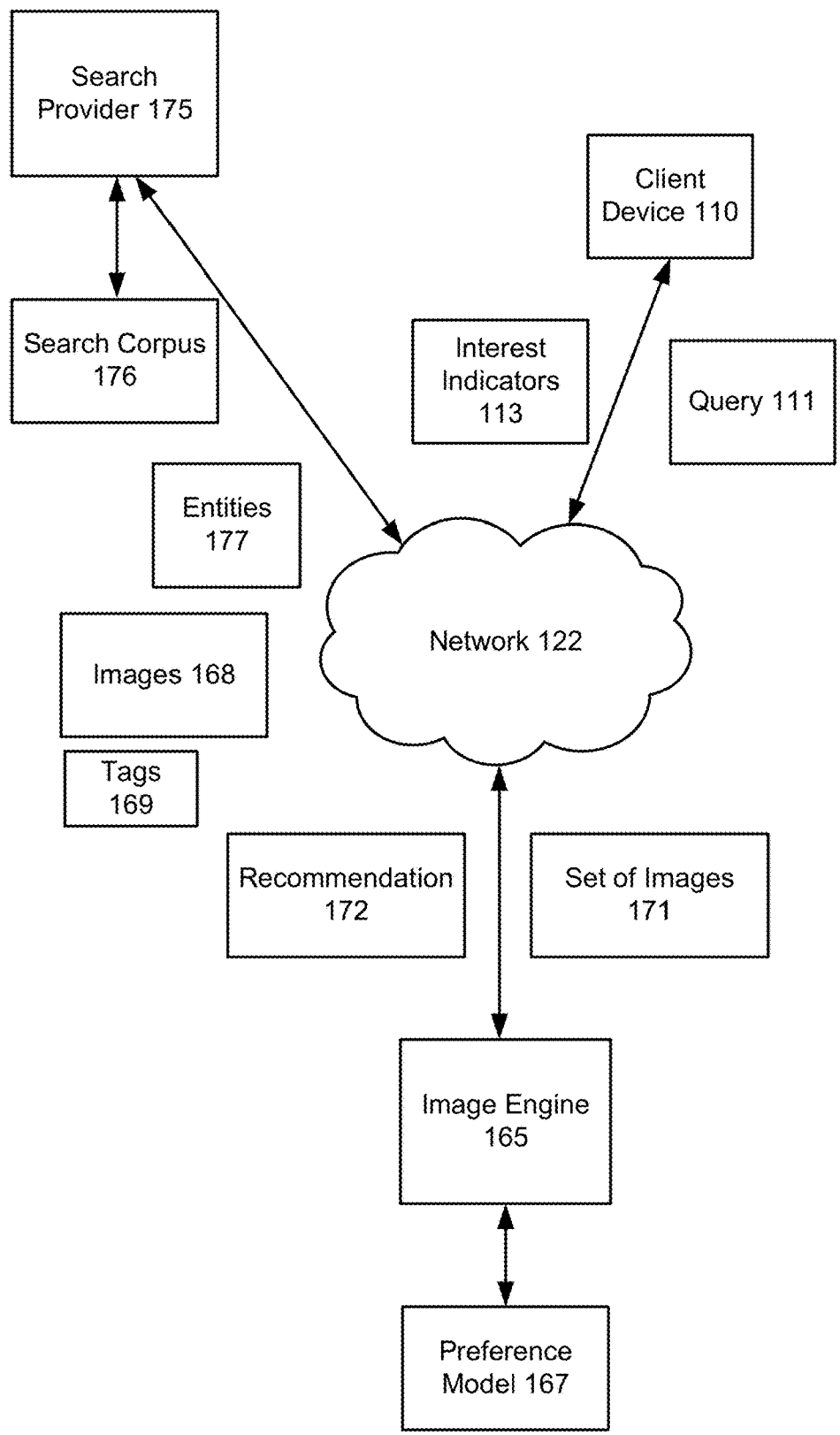
FIG. 1 is an illustration of an exemplary environment for presenting images for entities based on tags and a user preference model, receiving interest indicators for the presented images, and for recommending one or more of the entities based on the received interest indicators.

FIG. 1 is an illustration of an exemplary environment for presenting images for entities based on tags and a user preference model, receiving interest indicators for the presented images, and for recommending one or more of the entities based on the received interest indicators. The environment 100 may include an image engine 165, a search provider 175, and one or more client devices 110 in communication through a network 122. The network 122 may be a variety of network types including the public switched telephone network (PSTN), a cellular telephone network, and a packet switched network (e.g., the Internet). Although only one client device 110, one image engine 165, and one search provider 175 are shown in FIG. 1, there is no limit to the number of client devices 110, image engines 165, and search providers 175 that may be supported.

Figure 11:
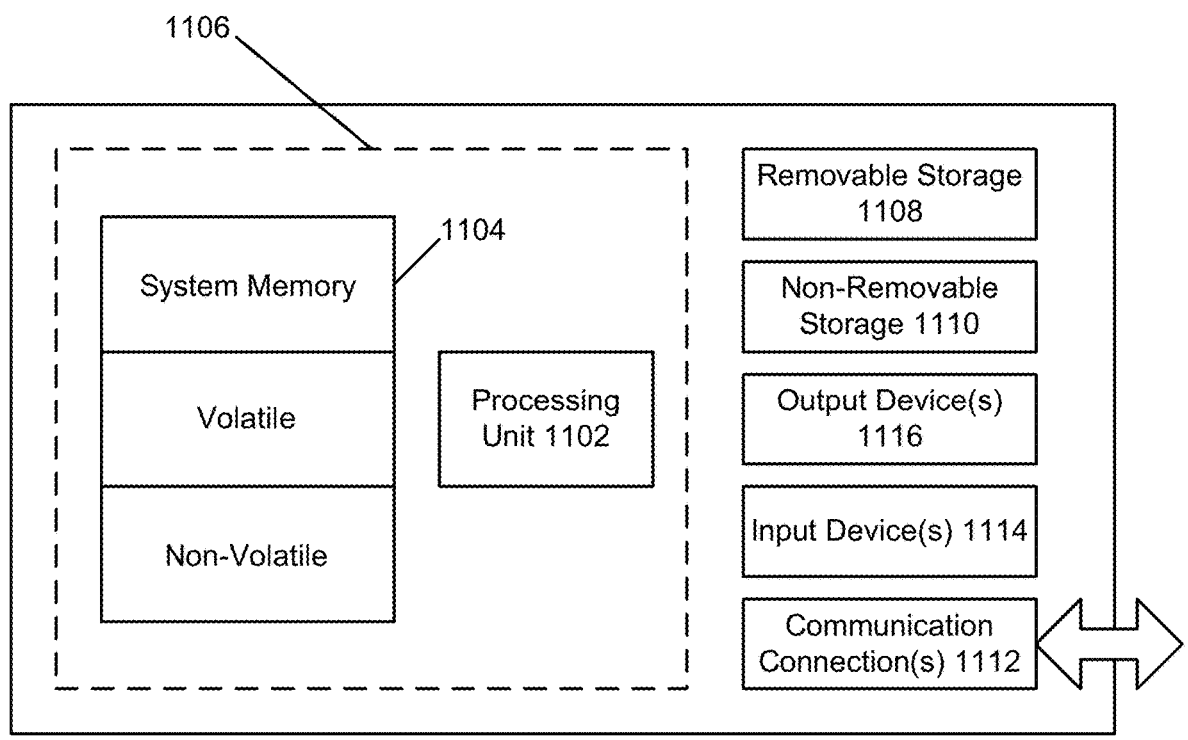
FIG. 11 shows an exemplary computing environment in which example embodiments and aspects may be implemented.

The client device 110 and the image engine 165 may be implemented using a variety of computing devices such as smartphones, desktop computers, laptop computers, tablets, set top boxes, vehicle navigation systems, and videogame consoles. Other types of computing devices may be supported. A suitable computing device is illustrated in FIG. 11 as the computing device 1100.

In some implementations, the client device 110 may be a computing device that is suited to provide one or more AR (augmented reality) applications. Example computing devices include a headset that allows light to pass through the headset such that a user can view their environment as if they were looking through conventional glasses, but that is configured to render virtual objects such that they appear to the user as if they are part of their environment. Another example computing device is a smartphone that can capture images or videos of a user's environment, and can render virtual objects into the captured images or videos as they are viewed by the user on a display associated with the smartphone.

The search provider 175 may receive queries 111 for one or more entities 177, and in response may identify entities 177 that are responsive to the queries 111 using a search corpus 176. The search corpus 176 may be an index, or other data structure, that associates keywords, or other data, with entities 177.

An entity 177 as defined herein may include a variety of people, places, and things. Examples of entities 177 that may be represented in the search corpus 176 may include places such as restaurants, hotels, resorts, cities, houses, buildings, etc., things such as vehicles, appliances, clothing, etc., and people such as celebrities, public figures, etc.

Each entity 177 may be associated with one or more images 168. Each image 168 may be associated with a tag 169. The tag 169 associated with an image 168 may describe or identify a particular attribute of the entity 177 that is associated with the image 168. For example, for entities 177 that are hotels, an image 168 of a pool associated with the hotel may be associated with the tag 169 "pool". For entities 177 that are vehicles, an image 168 of the interior of the vehicle may be associated with the tag 169 "interior". In another example, for entities 177 that are restaurants, an image 168 of a piece of cake served by the restaurant may be associated with tags 169 such as "desert" and/or "cake". Depending on the implementation, the tags 169 may be provided by the entities 177 themselves, provided by users or administrators, automatically generated using machine learning, or some combination of the above.

As described above, a drawback associated with current methods for searching for entities 177 such as hotels and restaurants is that users are forced to take additional steps to find desired information about the entities 177 and are unable to easily compare entities based on the desired information. For example, a user may be interested in selecting an entity 177 such as a hotel for an upcoming trip. Because the user is interested in fitness, for example, the user may be particularly interested in seeing the gyms offered at each hotel. After the user submits a query 111 to a search provider 175 that includes the desired dates and location, the search provider 175 may identify hotels that match the query 111. Typically, the hotels are identified to the user in a list that includes identification information about each hotel such as the location and prices, and may include images 168 of the exterior of the hotel.

However, as noted above, the user is interested in comparing hotels based on images 168 of gyms and may not be interested in the default images 168 that are provided by the search provider 175. The user is now forced to open additional browser windows, or visit additional webpages to determine the desired images 168 of gyms. Moreover, even if the user is able to locate the images 168 of gyms for each hotel, because these images 168 are scattered across multiple windows and webpages, comparing these images 168 may be difficult for the user.

To solve these drawbacks and others, the environment 100 may further include an image engine 165. The image engine 165 may receive entities 177 selected by a search provider 175 and may use what is referred to herein as a preference model 167 to select images 168 that are associated with the entities 177 based on the tags 169 associated with the images 168. The preference model 167 may be specific to each user of the image engine 165 and may reflect the type of images 168 that are interesting to the user or that are helpful for the user when selecting entities 177. The preference model 167 may be built and continuously updated by observing the image 168 and entity 177 preferences of each user.

The selected images 168 are presented to the user that provided the query 111 as the set of images 171. The selected images 168 may be presented to the user in a single user interface that allows the user to easily compare the images 168. The user may provide interest indicators 113 with respect to the images 168 in the set of images 171. The interest indicators 113 may be any type of indicator that shows interest (or disinterest) in the images 168 in the set of images 171 and may include clicks, selections, scores, ratings, "likes", etc. Based on the interest indicators 113 received for the images 168 of the set of images 171, the image engine 165 may generate and provide a recommendation 172 that includes one or more entities 177 selected based on the interest indicators 113.

Continuing the hotel entity 177 example above, a user may be interested in a hotel for an upcoming vacation. After the search provider 175 identifies hotel entities 177 that are responsive to a query 111, the image engine 165 may collect images 168 that are associated with each hotel entity 177. As described above, each image 168 may have a tag 169 that identifies the contents of the image 168 such as whether the image is of a pool, a bar, a room, or other hotel facility, for example.

Using the tags 169 associated with each image 168 and the preference model 167, the image engine 165 may select the images 168 that are likely to be relevant to the user. As described above, the user may select hotels based on the quality of the gym. Accordingly, the preference model 167 may tend to favor images 168 that have tags 169 such as "gym" or that are otherwise fitness related. The selected images 168 may be presented to the user as the set of images 171.

Depending on the implementation, the images 168 from the set of images 171 may be displayed on a client device 110 associated with the user. The images 168 from the set of images 171 may be grouped based on the associated hotel entity 177, or based on the associated tags 169. The images 168 may be displayed in a single user interface so that the user can easily compare all of the images 168 that are associated with the tag 169 "gym".

The user may provide interest indicators 113 with respect to the displayed images 168. For example, the user can select or highlight the "gym" images 168 that the user prefers, or can assign ratings or scores to some or all of the images 168.

After the user provides the interest indicators 113, the image engine 165 may provide a recommendation 172 that identifies at least one of the entities 177 and information about the identified entities 177. In some implementations, the image engine 165 may use the interest indicators 113 to determine which images 168 the user preferred, and may select the entities 177 associated with the preferred images 168 for the recommendation 172. Continuing the hotel example, the information included for each hotel entity 177 may include the name of the hotel, a phone number or other contact information of the hotel, and links or other user interface elements that may be used to book or reserve a room at the hotel.

As may be appreciated, the image engine 165 solves many of the drawbacks associated with traditional entity 177 search. For example, because the images 168 that are shown for each entity 177 are selected using a preference model 167 that is specific to each user, the user is likely to view images 168 that are relevant to the user's interests and the user is unlikely to have to perform additional searches or investigations to select an entity 177.

Additionally, because the user is shown all of the images 168 with the same tag 169 in the same user interface, the user is able to easily compare entities 177 based on images 168 having the same tag 169. Continuing the hotel example above, the user can compare hotel entities 177 based on images 168 of rooms, bars, gyms, and other amenities all from the same user interface.

In another implementation, the image engine 165 may allow multiple users to select entities 177 using interest indicators 113 received from each of the users. For example, a group of friends may be planning a group vacation and may be looking for a hotel entity 177. After submitting a query 111 to a search provider 175 by one of the members of the group, the image engine 165 may receive entities 177 that are responsive to the query 111 along with the associated images 168.

The image engine 165 may, for each user in the group of friends, use a preference model 167 associated with that user to select a set of images 171 from the images 168 based on the tags 169 associated with the images 168. Thus, each user may receive a different set of images 171 that is selected based on the user preferences of that user. For example, if a first user is interested in selecting a hotel based on room characteristics and a second user is interested in selecting a hotel based on the hotel bar, then the set of images 171 selected for the first user may include images 168 that are tagged "room" and the set of images 171 selected for the second user may include images 168 that are tagged "bar".

After each user of the group provides interest indicators 113, the image engine 165 may attempt to correlate the interest indicators 113 to determine which entities 177 were selected by the most users. The determined entities 177 may then be included in a recommendation 172 that is provided to each of the users. Continuing the example above, if the first user selects an image 168 of a hotel room associated with the same entity 177 as an image 168 of a bar selected by the second user, then the first and the second user may each receive a recommendation 172 that includes the hotel entity 177 selected by both of the users.

Figure 2:
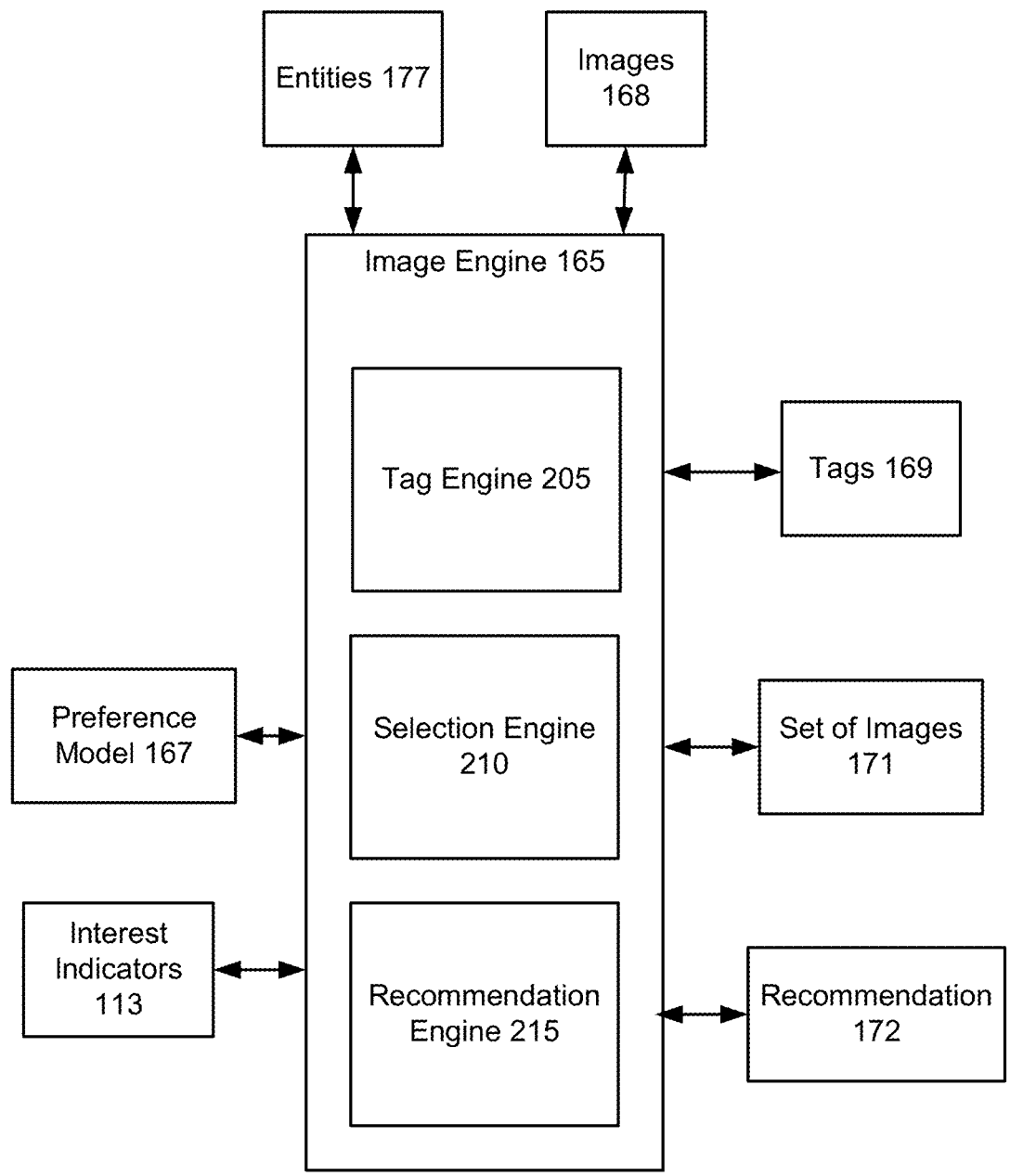
FIG. 2 is an illustration of an implementation of an exemplary image engine.

FIG. 2 is an illustration of an implementation of an exemplary image engine 165. The image engine 165 may include one or more components including a tag engine 205, a selection engine 210, and a recommendation engine 215. More or fewer components may be included in the image engine 165. Some or all of the components of the image engine 165 may be implemented by one or more computing devices such as the computing device 1100 described with respect to FIG. 11. In addition, some or all of the functionality attributed to the image engine 165 may be performed by the client device 110, or some combination of the client device 110 and the image engine 165.

The tag engine 205 may receive entities 177, and images 168 associated with each received entity 177. An entity 177 as used herein may represent a person, place, or thing. Examples of entities 177 include celebrities, hotels, houses, resorts, restaurants, and vehicles. Other types of entities 177 may be supported.

The entities 177 may be received from one or more search providers 175 in response to one or more queries 111, or any other type of request for an entity 177. For example, a user may have generated a query 111 for entities 177 such as a restaurant with availability at a particular date and location, or an item of clothing matching particular attributes. The search provider 175 may have received the query 111, and may have provided identifiers of matching entities 177 to the tag engine 205 in response to the query 111. Alternatively, the tag engine 205 and/or the image engine 165 may have generated the entities 177, and may have performed some or all of the functionality of the search provider 175.

The images 168 associated with each entity 177 may be received by the tag engine 205 along with the identifiers of entities 177. Alternatively, or additionally, some of the images 168 may be retrieved or collected by the tag engine 205. The tag engine 205 may collect images 168 for entities 177 from one or more social networking applications or websites based on metadata or other identification information associated with the images 168. For example, for entities 177 such as restaurants, the tag engine 205 may retrieve images 168 that were taken and posted by users of one or more social networking applications, or that were posted by users on one or more restaurant reviewing webpages or applications. The images 168 associated with each entity 177 may include professional or official images 168 provided by the entities 177 themselves, and non-official or amateur images 168 provided by users who are not affiliated with the entities 177.

The tag engine 205 may further determine one or more tags 169 for each image 168. The tags 169 for an image 168 may describe the contents of the image 168. For example, an image 168 of a hamburger may include tags 169 such as "food", "hamburger", "entrée", "sandwich", etc. In some implementations, the tags 169 may have already been assigned to each image 168. For example, the tags 169 may have been assigned by the entities 177 associated with the images 168, the user that provided the images 168, or the search provider 175.

In other implementations, the tag engine 205 may determine the tags 169 for each image 168 using machine learning. A machine learning algorithm may be trained on a set of images 168 that have already been assigned tags 169 by one or more users or administrators. The machine learning algorithm may be used to automatically determine tags 169 for untagged images 168. Any system or method for image identification using machine learning may be used.

The selection engine 210 may generate and maintain a preference model 167 for each user of the image engine 165. The preference model 167 may be used to select a set of images 171 from the images 168 that are associated with an entity 177 based on the tags 169 associated with the images 168.

In some implementations, the preference model 167 may be generated by the selection engine 210 based on the tags 169 associated with images 168 that the user provides positive interest indicators 113 and/or negative interest indicators 113 for. For example, if a user tends to provide positive interest indicators 113 (e.g., selections, "likes", or high ratings) to images 168 that have tags 169 such as "hamburger" and/or negative interest indicators 113 (e.g., no selections, no "likes", or low ratings) to images 168 that have tags 169 such as "hot dog", the preference model 167 may learn to favor images 168 that are tagged "hamburger" over images 168 that are tagged "hot dog" when selecting images 168 for the set of images 171.

In some implementations, the preference model 167 may further be based on preference information collected about the user. The collected information may include an internet history of the user (e.g., webpages viewed by the user or queries 111 submitted by the user), or information about the user collected from one or more social networking applications (e.g., profile information submitted by the user and "likes" or other indicators provided by the user in the social networking application). Any other information about the user that could be used to determine user preferences may also be used by the selection engine 210.

As may be appreciated, the various data and information collected about each user to create and maintain the preference models 167 may be personal and private. Accordingly, to protect the privacy of each user, any data collected by the selection engine 210 may be encrypted. Moreover, before any data is collected and used by the selection engine 210, each user may be asked to opt-in or otherwise consent to the collection and use of such data.

The selection engine 210 may use the preference model 167 to select a set of images 171 from the images 168 associated with the entities 177. In some implementations, the selection engine 210 may select the images 168 for the set of images 171 by ranking each image 168 using the preference model 167, and selecting the images 168 for the set of images 171 based in-part on the ranking. Other methods may be used. The number of images 168 in the set of images 171 may be set by a user or an administrator and may be based on the resolution or other characteristics of the client device 110 associated with the user that may view the images 168 in the set of images 171.

The selection engine 210 may provide the set of images 171 to the client device 110 associated with the user. The images 168 in the set of images 171 may be displayed to the user on a display associated with the client device 110. The images 168 may be displayed in groups based on the tags 169 associated with the images 168, or based on some other ordering method. Depending on the implementation, the images 168 may be displayed without any text or other indication of the entities 177 that are associated with each image 168.

In implementations where multiple users are associated with the entities 177, the selection engine 210 may select a set of images 171 for each associated user using the preference model 167 associated with the user. The set of images 171 selected for each user may then be provided by the selection engine 210 to the client device 110 associated with each respective user.

The recommendation engine 215 may receive interest indicators 113 with respect to one or more of the images 168 from the set of images 171, and may generate a recommendation 172 in response to the interest indicators 113. The recommendation 172 may identify one or more entities 177 that were associated with the images 168 of the set of images 171. As described above, interest indicators 113 may be indicators of interest (or disinterest) in the images 168 of the set of images 171 that were displayed to the user. The interest indicators 113 may include signals, selections, gestures (e.g., left or right swipes), "likes", and/or ratings or scores (e.g., 4/5, or three stars out of five), for example. Any method or technique for showing user interest or disinterest in a user interface may be used.

In implementations where a single user provided the interest indicators 113, the recommendation engine 215 may select one or more entities 117 by determining, based on the interest indicators 113, which images 168 from the set of images 171 that the user preferred. The recommendation engine 215 may generate a recommendation 172 that identifies some or all of the entities 177 that are associated with the images 168 that were preferred by the user. Continuing the hotel example, if the user provided an interest indicator 113 that is a selection of an image 168 of a particular hotel bar, then the recommendation engine 215 may include an identifier of the hotel in the recommendation 172.

In implementations where multiple users provided interest indicators 113, the recommendation engine 215 may select one or more entities 117 by correlating the interest indicators 113 received from each user to determine one or more entities 177 that are associated with images 168 that were preferred by the most users. The recommendation engine 215 may generate a recommendation 172 for each user that identifies some or all of the determined entities 177. Continuing the hotel example, if a first user provided an interest indicator 113 that rated an image 168 of a room at the "Hotel Monaco" highly, and a second user provided an interest indicator 113 rated an image 168 of a pool at the "Hotel Monaco" highly, then the recommendation engine 215 may add an indicator of the "Hotel Monaco" to the recommendation 172 that is provided to the client devices 110 associated with both the first user and the second user.

The recommendation 172 may include a variety of information about each identified entity 177. The information may include a name of the entity 177, descriptive information about each entity 177, images 168 associated with the entity 177, user ratings or reviews of the entity 177, and one or more links that can be used to purchase or reserve the entity 177. Other information may also be included.

For example, for hotel entities 177, the recommendation 172 may include for each entity 177 the name of the hotel, the location of the hotel, the cost of the hotel, images 168 of the hotel, user reviews of the hotel taken from one or more travel websites or social networking applications, and a link that can be used to book or reserve the hotel. For restaurant entities 177, the recommendation 172 may include for each entity 177 the name of the restaurant, the location of the restaurant, an estimated price of a meal at the restaurant, images 168 of the restaurant and images 168 of particular dishes, user reviews of the restaurant, and a link that can be used to book or reserve the restaurant.

Figure 3:
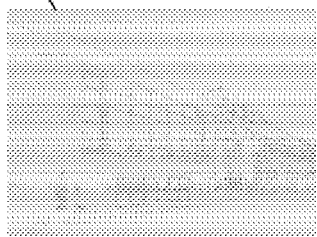
FIGS. 3-7 are illustrations of example user interfaces for viewing images, providing interest indicators, and for viewing recommendations based on the provided interest indicators.
Figure 3:
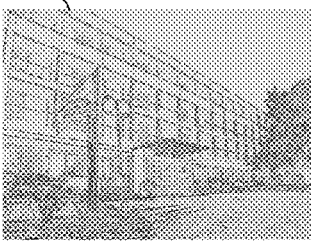
Figure 3:
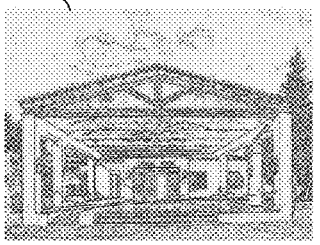
Figure 3:
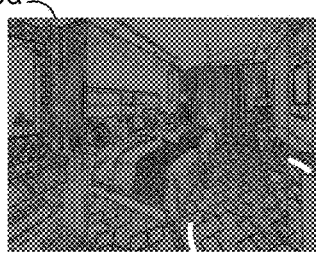
Figure 3:
Figure 3:
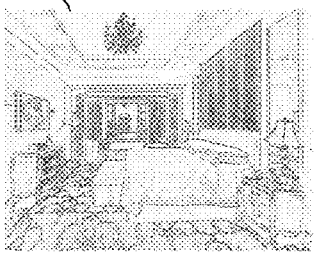
Figure 3:
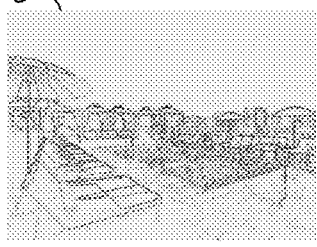
Figure 3:
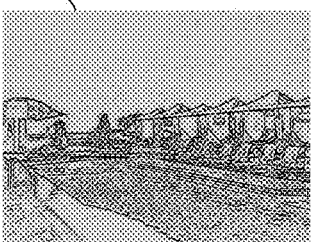
Figure 3:
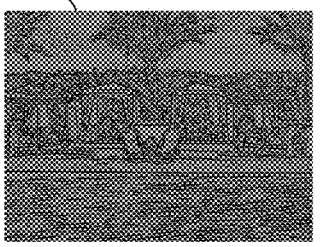
Figure 3:
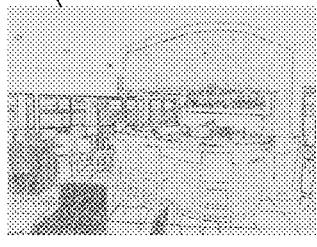
Figure 3:
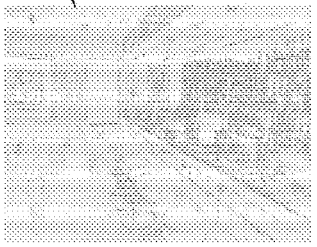
Figure 3:
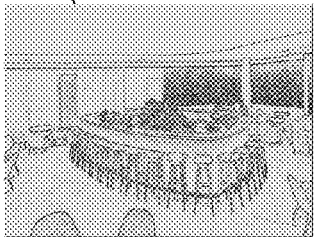

FIG. 3 is an illustration of an example user interface 300 for viewing images 168 of entities 177, and for selecting entities 177 based on the images 168. The user interface 300 may be implemented by the client device 110 associated with the user. The user interface 300 may be rendered and displayed on a variety of client devices 110 including, but not limited to smartphones, tablet computers, head-mounted displays or headsets, and videogame devices.

As shown in a window 320, a user has been presented with multiple images 168 (i.e., the images 330a, 330b, 330c, 330d, 330e, 330f, 330g, 330h, 330i, 330j, 330k, and 330l). As can be seen in the text that is displayed at the top of the window 320, the images 168 may have been presented to the user in response to a query 111 for entities 177 such as hotels in San Diego that are available from August 1-August 5.

Each of the images 168 may have been selected by the selection engine 210 to present to the user using a user-specific preference model 167 and the tags 169 associated with the images 168. The preference model 167 may reflect the interests of the user and may be based on the tags 169 of images 168 previously selected by the user in response to other queries 111.

The images 330a, 330b, and 330c are images of hotel exteriors and indicate that the user has previously considered images 168 of exteriors when selecting hotels. The images 330d, 330e, and 330f are images of hotel rooms and indicate that the user has previously considered images 168 of rooms when selecting hotels. The images 330g, 330h, and 330i are images of hotel pools and indicate that the user has previously considered images 168 of pools when selecting hotels. The images 330j, 330k, and 330l are images of hotel bars and indicate that the user has previously considered images 168 of bars when selecting hotels.

In the example shown, each of the images 168 is displayed to the user in the window 320 without any text or other information that may identify the particular hotel that the image 168 is associated with. Depending on the implementation, the user may choose to view or not view this information along with each image 168.

After viewing the images 168, the user may provide interest indicators 113 by selecting or highlighting the images 168 that the user is interested in. After selecting one or more of the images 168, the user may select or press the user interface element 340 labeled "Submit". In response to the selection, the client device 110 may send interest indicators 113 that include the selected images 168.

Figure 4:
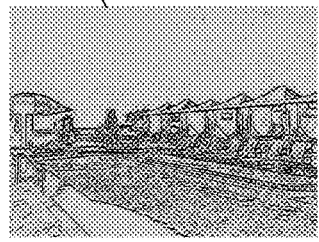
Figure 4:
Figure 4:
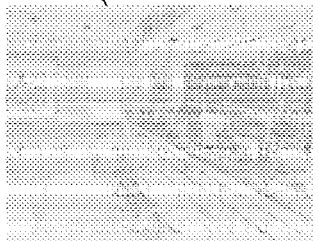

Continuing to FIG. 4, the user may have selected the images 330h, 330g, and 330k. In response, the selection of the images 330h, 330g, and 330k is provided to the image engine 165 as the interest indicators 113, and used to generate a recommendation 172 that is provided to the client 110 and displayed in the window 320. The text displayed in the window 320 has been updated to inform the user that the recommendations are based on the images 168 selected by the user.

In the example shown, the recommendation 172 includes windows 410 (i.e., the windows 410a and 410b) each showing a different hotel entity 177 that is recommended based on the selected images 168. The window 410a recommends a hotel called the "Balboa Hotel" based on the selection of the associated image 330h which is also displayed in the window 410a. The window 410b recommends a hotel called "Old Town Hotel" based on the selection of the associated images 330g and 330k. Also shown in each window 410 is various descriptive information about each hotel such as address and price, and a user interface element 440 (i.e., the user interface elements 440a and 440b) labeled "Book" that can be used to reserve the associated hotel.

In addition, the window 420 includes a user interface element 450 labeled "Pick Again" that the user can select or press if they are not satisfied with the recommendation 172. If the user selects the user interface element 450 the original images 168 may be displayed to the user again (i.e., the images 330a-330l). Alternatively, new images 168 may be selected and displayed by the image engine 165.

Figure 5:
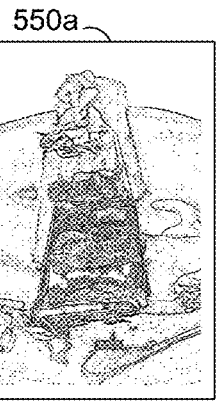
Figure 5:
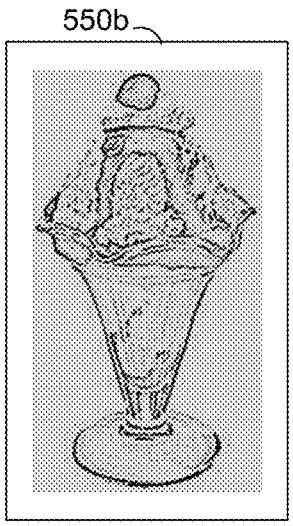
Figure 5:
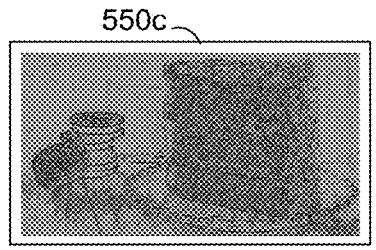
Figure 5:
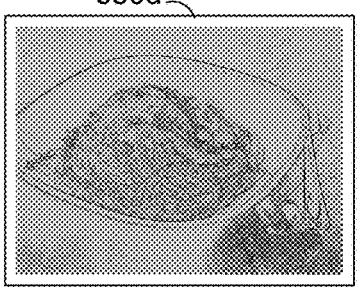
Figure 5:
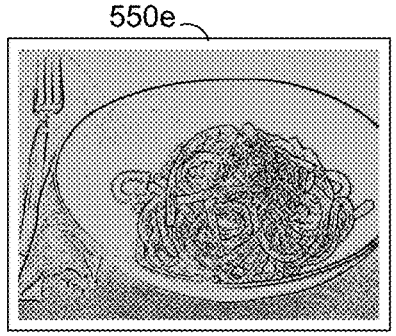
Figure 5:
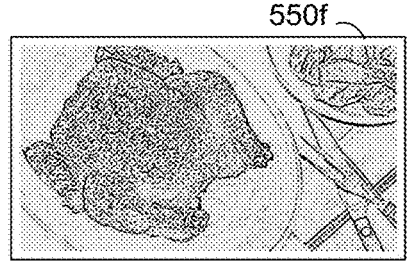

FIG. 5 is an illustration of an example user interface 500 for viewing images 168 of entities 177, and for selecting entities 177 based on the images 168. In the example shown, two users (i.e., Jim and Gina) may be using the image engine 165 to select a restaurant entity 177 for an upcoming reservation. Accordingly, one or both of Jim and Gina may have submitted a query 111 to a search provider 175 that included criteria related to the reservation such as the date, location, and number of people. In response, the search provider 175 generates restaurant entities 177 that matched the query 111, and provides the matching entities 177 and associated images 168 to the image engine 165. The image engine 165 may select a set of images 171 for Jim based on the tags 169 associated with the images 168 and the preference model 167 associated with Jim, and may select a set of images 171 for Gina based on the tags 169 associated with the images 168 and the preference model 167 associated with Gina.

The user interface 500 includes a window 520 that displays the set of images 171 (i.e., the images 550a, 550b, 550c, 550d, 550e, and 550f) selected for Jim using the preference model 167 associated with Jim. The user interface 500 may be displayed to Jim on a client device 110 associated with Jim. Each of the displayed images 168 in the set of images 168 is associated with a restaurant entity 177 that was identified by the search provider 175.

Because the images 168 of the set of images 171 selected for Jim are based on the preference model 167 associated with Jim, the contents of the images 168 reflect the interests of Jim. As shown, the displayed images 168 include the images 550a, 550b, and 550c of desserts, which indicates that Jim has previously shown an interest in desserts when selecting restaurant entities 177. The displayed images 168 include the images 550d and 550e of pasta, which indicates that Jim has previously shown an interest in pasta. The displayed images 168 include the image 550f of chicken which indicates that Jim has previously shown an interest in chicken dishes.

After viewing the displayed images 168, Jim may select the images 550e and 550f. Jim may select the user interface element 540 labeled "Submit" to provide the interest indicators 113 that identify the selected images 550e and 550f to the image engine 165.

Figure 6:
Figure 6:
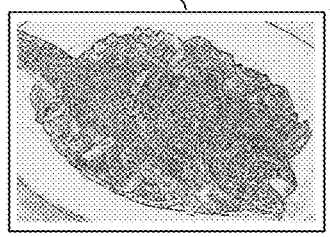
Figure 6:
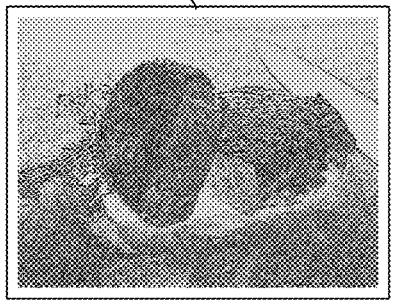
Figure 6:
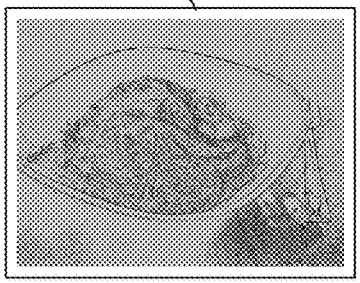
Figure 6:
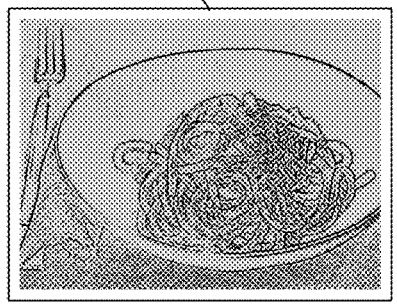

Continuing to FIG. 6, the user Gina may receive a set of images 171 that are displayed on a client device 110 associated with Gina in a user interface 600. The user interface 600 includes a window 620 where the images 550f, 650a, 650b, 550d, and 550e from the set of images 171 selected for Gina are displayed.

The displayed images 168 of the set of images 171 are selected using the preference model 167 associated with Gina, and are therefore different than the set of images 171 displayed to Jim in FIG. 5. For example, the displayed images 168 for Gina do not include any images 168 of desserts.

After viewing the displayed images 168, Gina may select the images 550e, 550f, and 650a. Gina may select the user interface element 640 labeled "Submit" to provide the interest indicators 113 that identify the selected images 550, 550f, and 650a to the image engine 165.

Figure 7:
Figure 7:
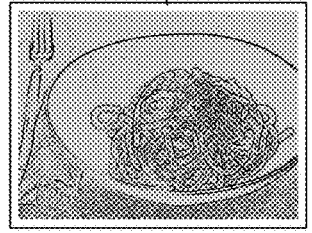

Continuing to FIG. 7, the image engine 165 may receive the interest indicators 113 from Gina and the interest indicators 113 from Jim and may correlate the interest indicators 113 to determine an entity 177 for a recommendation 172 that is provided to the client devices 110 associated with Gina and Jim.

As shown in FIG. 7, a user interface 700 may be implemented on either of the client devices 110 associated with Jim and Gina. The user interface 700 includes a window 720 and a window 710 that displays information related to a restaurant entity 177 that is selected for the recommendation 172 that was provided to both Jim and Gina. The restaurant is named "Roberto's" and is chosen by the image engine 165 because both Jim and Gina selected the images 550f and 550e which are associated with the entity 177 "Roberto's". The text displayed in the window 720 indicates that the recommended entity 177 is based on the images 168 selected by both Jim and Gina.

Also shown in the window 710 is various descriptive information about the restaurant entity 177 such as address and price, and a user interface element 740 labeled "Book" that can be used by either Jim or Gina to reserve the associated restaurant.

In addition, the window 720 includes a user interface element 750 labeled "Pick Again" that either Gina or Jim can select or press if they are not satisfied with the recommendation 172. Depending on the implementation, if either user selects the user interface element 750 the original images 168 may be displayed to both users again, or only to the user that selected the user interface element 750. The image engine 168 may re-select entities 177 for the recommendation 172 based on any changes to the images 168 selected by the users.

Figure 8:
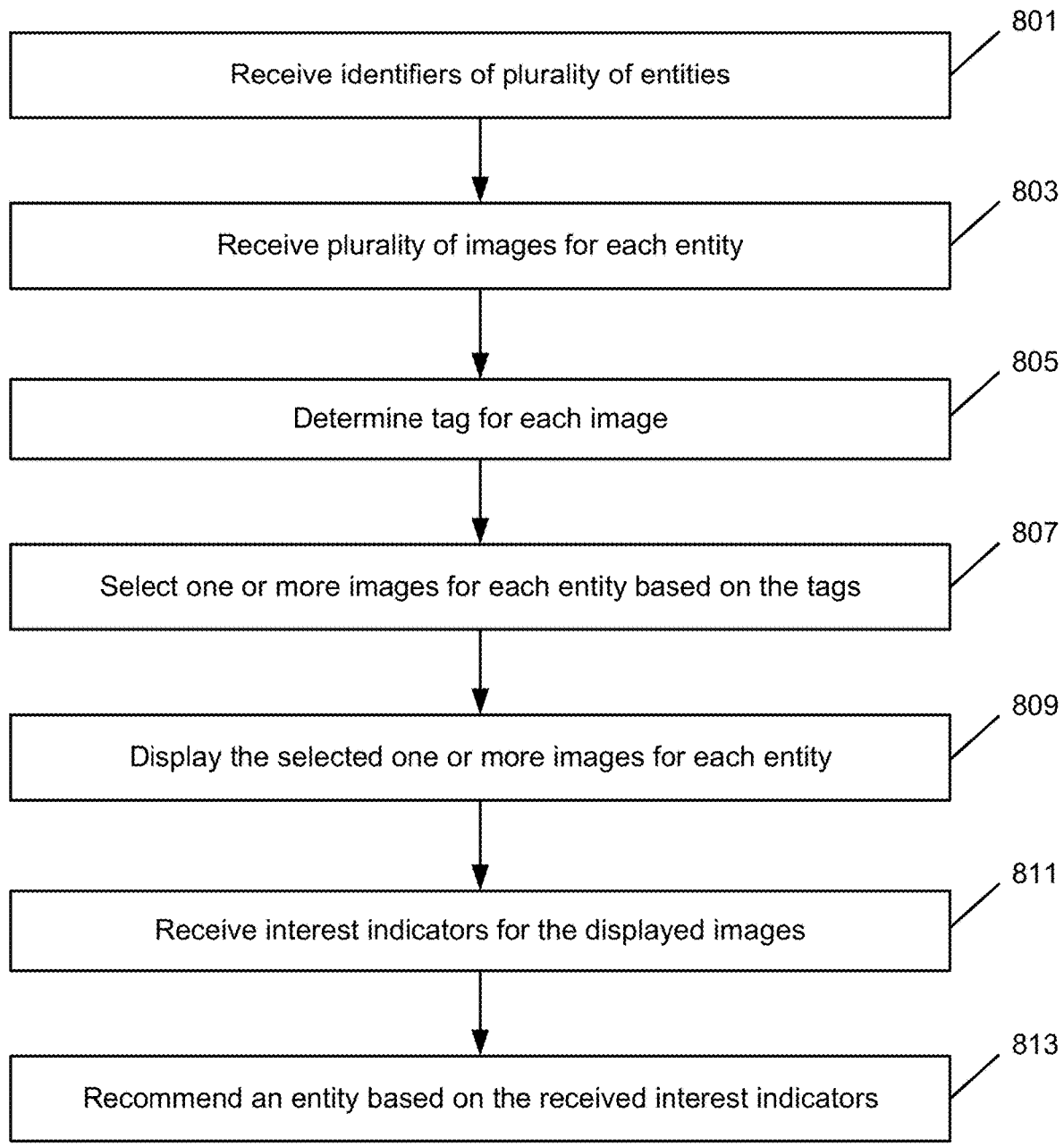
FIG. 8 is an operational flow of an implementation of a method for recommending an entity based on interest indicators received from a user.

FIG. 8 is an operational flow of an implementation of a method 800 for recommending an entity based on interest indicators received from a user. The method 800 may be implemented by the image engine 165 and/or the client device 110.

At 801, identifiers of a plurality of entities are received. The identifiers of a plurality of entities 177 may be received by the image engine 165. The entities 177 may represent a variety of people, places, and things such as hotels and restaurants. Depending on the implementation, the identifiers of entities 177 may have been received from one or more search providers 175 in response to a query 111 received from a user.

At 803, a plurality of images is received for each entity. The plurality of images 168 for each entity 177 may be received by the tag engine 205 of the image engine 165. In some implementations, the plurality of images 168 received for each entity 177 may be received from the one or more search providers 175 along with the identifiers of the entities 177. Alternatively, or additionally, the images 168 may be received from one or more users, or received from one or more social networking applications, for example.

At 805, a tag is determined for each image. The tag 169 for each image 168 may be determined by the tag engine 205. The tag 169 associated with an image 168 may describe the contents of the image 168. Each image 168 may have one, or more than one, tag 169. In some implementations, the images 168 received by the tag engine 205 may already have an associated tag 169. Alternatively, the tag engine 205 may determine the one or more tags 169 for each image 168 using machine learning. Any method for determining the contents of an image 168 may be used.

At 807, one or more images are selected for each entity based on the tags. The one or more images 168 may be selected for each entity 177 by the selection engine 210 based on the tags 169 associated with each image 168 using a preference model 167 associated with the user that will receive the selected images 168. The selected images 168 may be provided to a client device 110 associated with the user by the selection engine 210 as the set of images 171.

At 809, the selected one or more images are displayed for each entity. The selected images 168 from the set of images 171 may be displayed on the client device 110 associated with the user.

At 811, interest indicators are received for the displayed images. The interest indicators 113 may be received by the recommendation engine 215 from the client device 110. The interest indicators 113 may include clicks or selections of one or more of the images 168 of the set of images 171. Other types of indicators such as scores or ratings may also be supported.

At 813, an entity is recommended based on the received interest indicators. The entity 177 may be recommended by the recommendation engine 215 based on the received interest indicators 113. For example, the recommendation engine 215 may determine the entity 177 whose associated images 168 received the greatest amount of positive interest indicators 113. The recommendation engine 215 may generate a recommendation 172 that includes the determined entity 177 and other information about the entity 177 such as location, cost, associated images 168, etc. The recommendation 172 may be provided to the client device 110 by the recommendation engine 215.

Figure 9:
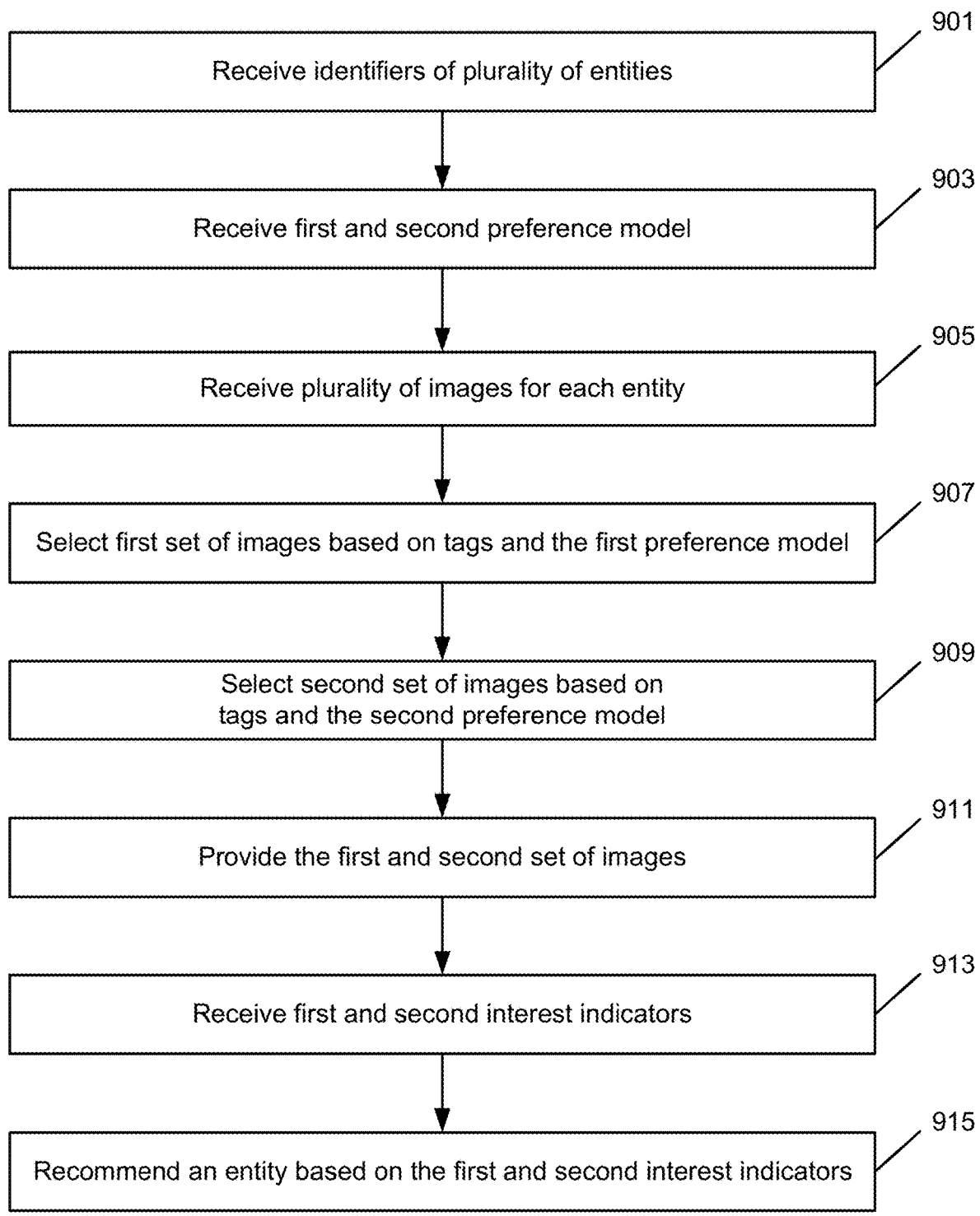
FIG. 9 is an operational flow of an implementation of a method for recommending an entity based on interest indicators received from two or more users.

FIG. 9 is an operational flow of an implementation of a method 900 for recommending an entity based on interest indicators received from two or more users. The method 900 may be implemented by the image engine 165 and/or the client device 110.

At 901, identifiers of a plurality of entities are received. The identifiers of a plurality of entities 177 may be received by the image engine 165. Depending on the implementation, the entities 177 may have been received from one or more search providers 175 in response to a query 111 received from either a first user or a second user. The first and second user may be jointly trying to select an entity 177 such as a hotel, restaurant, or home, for example. The query 111 may identify one or both of the first user and the second user.

At 903, a first preference model and a second preference model are received. The first preference model 167 and the second preference model 167 may be received by the selection engine 210. Each user may have an associated preference model 167 that has been trained to select images 168 that the associated user is interested in or prefers based on tags 169 associated with the images 168.

At 905, a plurality of images is received for each entity. The plurality of images 168 for each entity 177 may be received by the selection engine 210 of the image engine 165. In some implementations, the plurality of images 168 received for each entity 177 may be received from the one or more search providers 175 along with the identifiers of the entities 177. Each image 168 may be associated with one or more tags 169 that describes the contents of the image 168. The tags 169 may already be associated with the images 168, or may be determined by the image engine 165 using machine learning, for example.

At 907, a first set of images is selected. The first set of images 171 may be selected for the first user, and may be selected by the selection engine 210 based on the tags 169 associated with each image 168 and the first preference model 167 associated with the first user.

At 909, a second set of images is selected. The second set of images 171 may be selected for the second user, and may be selected by the selection engine 210 based on the tags 169 associated with each image 168 and the second preference model 167 associated with the second user.

At 911, the first and second set of images are provided. The first set of images 171 may be provided by the selection engine 210 to a client device 110 associated with the first user, and the second set of images 171 may be provided by the selection engine 210 to a client device 110 associated with the second user. The first and second sets of images 171 may be displayed to the first and second users on their respective client devices 110.

At 913, first and second interest indicators are received for the provided images. The first interest indicators 113 may be received by the recommendation engine 215 from the client device 110 associated with the first user. The second interest indicators 113 may be received by the recommendation engine 215 from the client device 110 associated with the second user. The first interest indicators 113 may include clicks or selections of one or more of the images 168 of the first set of images 171 made by the first user. The second interest indicators 113 may include clicks or selections of one or more of the images 168 of the second set of images 171 made by the second user.

At 915, an entity is recommended. The entity 177 may be recommended by the recommendation engine 215 based on the first interest indicators 113 and the second interest indicators 113. For example, the recommendation engine 215 may determine the entity 177 whose associated images 168 received the greatest amount of positive interest indicators 113 from both the first user and the second user. The recommendation engine 215 may generate a recommendation 172 that includes the determined entity 177 and other information about the entity such as location, cost, associated images 168, etc. The recommendation 172 may be provided to the client device 110 associated with the first user and the client device 110 associated with the second user by the recommendation engine 215.

Figure 10:
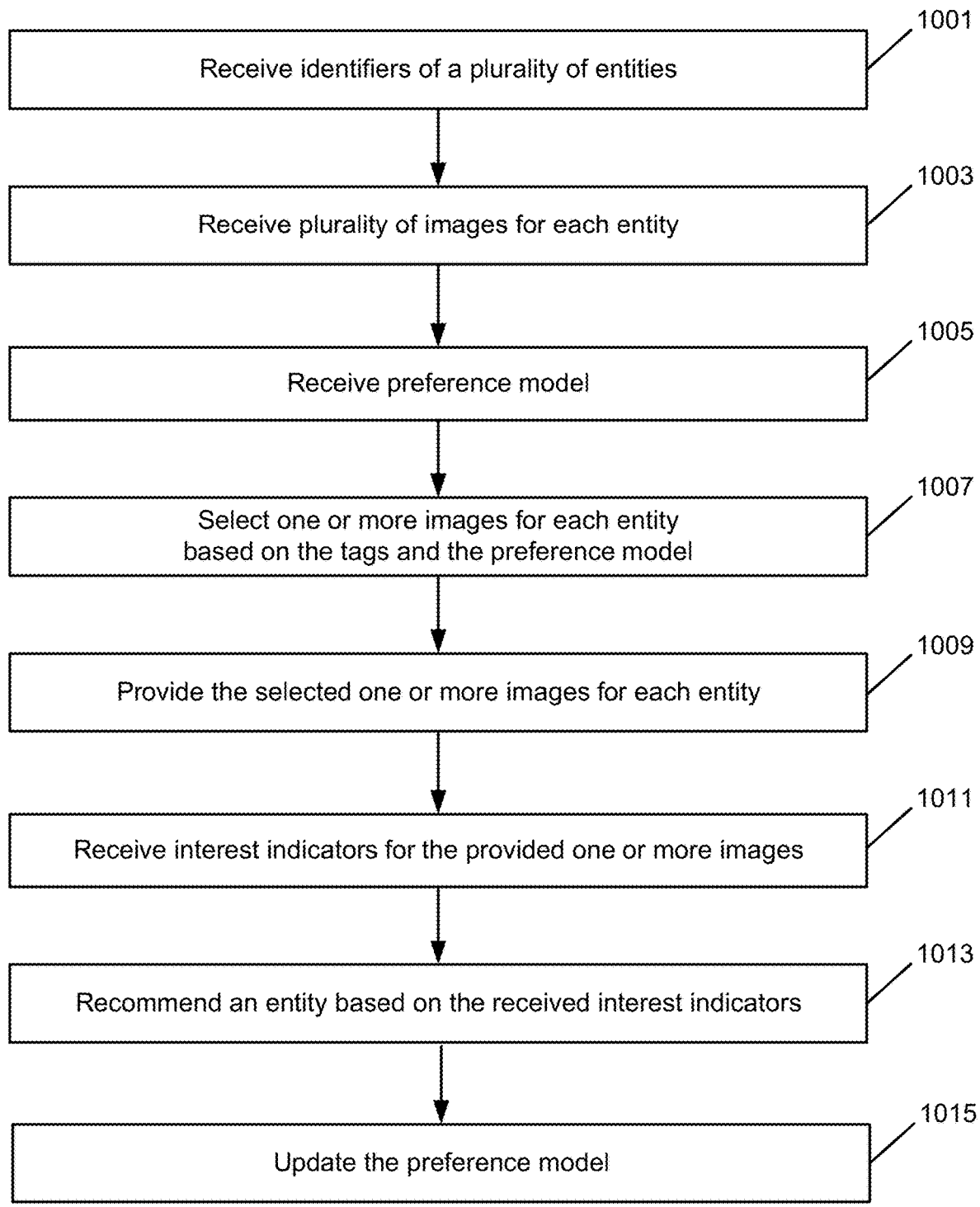
FIG. 10 is an operational flow of an implementation of a method for recommending an entity based on interest indicators received from a user and for updating a preference model.

FIG. 10 is an operational flow of an implementation of a method 1000 for recommending an entity based on interest indicators received from a user and for updating a preference model. The method 1000 may be implemented by the image engine 165 and/or the client device 110.

At 1001, identifiers of a plurality of entities are received. The identifiers of a plurality of entities 177 may be received by the image engine 165. Depending on the implementation, the identifiers of entities 177 may have been received from one or more search providers 175 in response to a query 111 received from a user.

At 1003, a plurality of images is received for each entity. The plurality of images 168 for each entity 177 may be received by the selection engine 210 of the image engine 165. Each image 168 may be associated with one or more tags 169. The tags 169 may already be associated with the images 168, or may be determined by the image engine 165 using machine learning, for example.

At 1005, a preference model is received. The preference model 167 may be received by the selection engine 210. Each user associated with the image engine 210 may have a preference model 167 that has been trained to select images 168 that the user is interested in based on tags 169 associated with the images 168.

At 1007, one or more images are selected based on the tags. The one or more images 168 may be selected for each entity 177 by the selection engine 210 based on the tags 169 associated with each image 168 using the received preference model 167.

At 1009, the selected one or more images are provided. The selected one or more images 168 may be provided by the selection engine 210 to a client device 110 associated with the user as the set of images 171. The images 168 of the set of images 171 may be displayed to the user on their associated client device 110.

At 1011, interest indicators are received for the provided one or more images. The interest indicators 113 may be received by the recommendation engine 215 from the client device 110 that was provided the one or more images 168. The interest indicators 113 may include clicks or selections of the images 168 of the set of images 171. Other types of indicators such as scores, ratings, or rankings may also be supported.

At 1013, an entity is recommended based on the received interest indicators. The entity 177 may be recommended by the recommendation engine 215 based on the interest indicators 113. For example, the recommendation engine 215 may determine the entity 177 whose associated images 168 received the greatest amount of positive interest indicators 113. The recommendation engine 215 may generate a recommendation 172 that includes the determined entity 177 and other information about the entity such as location, cost, associated images 168, etc. The recommendation 172 may be provided to the client device 110 by the recommendation engine 215.

At 1015, the preference model is updated. The preference model 167 may be updated by the selection engine 210 to reflect the most recently received interest indicators 113. Any method or technique for updating a model may be used.

FIG. 11 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 11, an exemplary system for implementing aspects described herein includes a computing device, such as computing device 1100. In its most basic configuration, computing device 1100 typically includes at least one processing unit 1102 and memory 1104. Depending on the exact configuration and type of computing device, memory 1104 may be volatile (such as random access memory (RAM)), non-volatile (such as read-only memory (ROM), flash memory, etc.), or some combination of the two. This most basic configuration is illustrated in FIG. 11 by dashed line 1106.

Computing device 1100 may have additional features/functionality. For example, computing device 1100 may include additional storage (removable and/or non-removable) including, but not limited to, magnetic or optical disks or tape. Such additional storage is illustrated in FIG. 11 by removable storage 1108 and non-removable storage 1110.

Computing device 1100 typically includes a variety of computer readable media. Computer readable media can be any available media that can be accessed by the device 1100 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1104, removable storage 1108, and non-removable storage 1110 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer storage media may be part of computing device 1100.

Computing device 1100 may contain communication connection(s) 1112 that allow the device to communicate with other devices. Computing device 1100 may also have input device(s) 1114 such as a keyboard, mouse, pen, voice input device, touch input device, etc. Output device(s) 1116 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a system for selecting and displaying images for each of a plurality of entities and for recommending an entity of the plurality of entities based on interest indicators is provided. The system includes at least one computing device and an image engine. The image engine: receives identifiers of a plurality of entities; receives a plurality of images for each entity of the plurality of entities, wherein each image is associated with a tag; for each entity of the plurality of entities, selects one or more images of the plurality of images associated with the entity based on the tags associated with the images of the plurality of images associated with the entity; for each entity of the plurality of entities, displays the selected one or more images associated with entity; receives interest indicators for the displayed images; and based on the received interest indicators, recommends an entity of the plurality of entities.

Implementations may include some or all of the following features. The image engine may further display information associated with the recommended entity. The image engine that selects one or more images of the plurality of images associated with the entity based on the tags associated with the images of the plurality of images associated with the entity may include an image engine that: receives a preference model associated with a user; and selects one or more images of the plurality of images associated with the entity based on the tags associated with the images of the plurality of images associated with the entity using the received preference model. The image engine further determines the tag associated with at least one image using machine learning. The identifiers of the plurality of entities may be received in response to a query. The image engine further: receives a preference model associated with a user; and updates the preference model based on the received interest indicators. The received interest indicators may include a selection of at least one image of the displayed images, or a score for at least one image of the displayed images. The received interest indicators may include a ranking of the displayed images. The entities may include hotels, restaurants, resorts, venues, locations, houses, or vehicles. The at least one computing device may include one or more of a smartphone, a tablet computer, or a head mounted display device.

In an implementation, a system for selecting and presenting images for each of a plurality of entities and for recommending an entity of the plurality of entities based on interest indicators is provided. The system may include at least one computing device and an image engine. The image engine: receives identifiers of a plurality of entities; receives a first preference model associated with a first user and a second preference model associated with a second user; receives a plurality of images for each entity of the plurality of entities, wherein each image is associated with a tag; selects a first set of images from the plurality of images associated with each entity based on the tags associated with the images and the first preference model; provides the first set of images to the first user; selects a second set of images from the plurality of images associated with each entity based on the tags associated with the images and the second preference model; provides the second set of images to the second user; receives first interest indicators from the first user for the first set of images; receives second interest indicators from the second user for the second set of images; and based on the first and second interest indicators, recommends an entity of the plurality of entities to the first user and the second user.

Implementations may include some or all of the following features. The image engine further provides information associated with the recommended entity. The image engine further generates the tag associated with each image using machine learning. The identifiers of the plurality of entities may be received in response to a query received from the first user, and further wherein the query may identify the second user. The entities may include hotels, restaurants, resorts, venues, locations, houses, and/or vehicles.

In an implementation, a method for selecting and presenting images for each of a plurality of entities and for recommending an entity of the plurality of entities based on interest indicators is provided. The method includes receiving identifiers of a plurality of entities by a computing device; receiving a plurality of images for each entity of the plurality of entities by the computing device, wherein each image is associated with a tag; for each entity of the plurality of entities, selecting one or more images of the plurality of images associated with the entity based on the tags associated with the images of the plurality of images associated with the entity and a preference model by the computing device; for each entity of the plurality of entities, providing the selected one more images associated with entity by the computing device; receiving interest indicators in the provided images by the computing device; and based on the received interest indicators, recommending an entity of the plurality of entities by the computing device.

Implementation may include some or all of the following features. The method may further include providing information associated with the recommended entity. The method may further include generating the tag associated with each image using machine learning. The identifiers of the plurality of entities may be received in response to a query. The entities may include hotels, restaurants, resorts, venues, houses, locations, and/or vehicles.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment.

Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system, comprising:
   at least one hardware processor; and
   an image engine executed by the at least one hardware processor that:
      receives identifiers of a plurality of entities from one or more search providers responsive to the one or more search providers receiving a query from a client device of a user;
      receives a plurality of images for each entity of the plurality of entities from the one or more search providers, wherein each image is associated with a tag and corresponds to one of the entities;
      for each entity of the plurality of entities, selects one or more images of the plurality of images associated with the entity based on the tag associated with each image;
      causes the selected one or more images associated with each entity of the plurality of entities to be displayed in one or more groupings via a user interface of the client device of the user, each displayed grouping including images associated with one or more different entities of the plurality of entities, the images of each displayed grouping being associated with a same tag and displayed for comparison concurrently in the user interface, responsive to the selection of the one or more images for each entity; and
      receives one or more interest indicators for at least one of the displayed images in one of the displayed groupings input by the user via the user interface of the client device of the user, wherein each interest indicator received for a particular image comprises a selection of or click on the particular image;
      responsive to receiving the one or more interest indicators, determines at least one entity of the plurality of entities whose associated one or more displayed images received one or more interest indicators; and
      causes the determined at least one entity to be displayed via the user interface of the client device of the user.

2. The system of claim 1, wherein the image engine further displays information associated with the determined at least one entity.

3. The system of claim 1, wherein the image engine further: receives a preference model associated with the user; and for each entity of the plurality of entities, selects the one or more images of the plurality of images associated with the entity based on the tag associated with each image using the received preference model.

4. The system of claim 1, wherein the image engine further: receives a preference model associated with the user; and updates the preference model based on the received one or more interest indicators.

5. The system of claim 1, wherein the received one or more interest indicators comprise a score for at least one image of the displayed images.

6. The system of claim 1, wherein the received one or more interest indicators comprise a ranking of the displayed images.

7. The system of claim 1, wherein the entities comprise hotels, restaurants, resorts, venues, locations, houses, or vehicles.

8. The system of claim 1, wherein the at least one hardware processor is a component of at least one computing device comprising one or more of a smartphone, a tablet computer, or a head mounted display device.

9. A method, comprising:
- receiving, at one or more service providers, a query from a client device of a user;
- responsive to receiving the query, receiving, by a computing device, identifiers of a plurality of entities from the one or more search providers;
- receiving a plurality of images for each entity of the plurality of entities from the one or more search providers, by the computing device, wherein each image is associated with a tag and corresponds to one of the entities;
- for each entity of the plurality of entities, selecting, by the computing device, one or more images of the plurality of images associated with the entity based on the tag associated with each image;
- causing the selected one or more images associated with each entity of the plurality of entities to be displayed in one or more groupings for comparison concurrently in a user interface of the client device of the user, each displayed grouping including images associated with one or more different entities of the plurality of entities, the images of each displayed grouping being associated with a same tag, responsive to the selection of the one or more images for each entity;
- receiving, by the computing device, one or more interest indicators for at least one of the displayed images in one of the displayed groupings input by the user via the user interface of the client device, wherein each interest indicator received for a particular image comprises a selection of or click on the particular image;
- responsive to receiving the one or more interest indicators, determining, by the computing device, at least one entity of the plurality of entities whose associated one or more displayed images received one or more interest indicators; and
- causing the determined at least one entity to be displayed via the user interface of the client device of the user.

10. The method of claim 9, further comprising providing information associated with the determined at least one entity.

11. The method of claim 9, wherein the entities comprise hotels, restaurants, resorts, venues, locations, houses, or vehicles.

* * * * *